United States Patent [19]
Pajonk et al.

[11] Patent Number: 5,795,557
[45] Date of Patent: Aug. 18, 1998

[54] PROCESS FOR THE PREPARATION OF MONOLITHIC SILICA AEROGELS

[75] Inventors: Gérard Pajonk, Lyons; Elimame Elaloui, Vaulx en Velin; Redouane Begag, Bron; Marcel Durant, Mennecy; Bruno Chevalier, Grenoble; Jean-Luc Chevalier, St Etienne de Crossey; Patrick Achard, Le Plan de Grasse, all of France

[73] Assignees: Universite Claude Bernard, Villeurbanne; Produits Chimiques Auxiliares, Longjumeau; Armienes; Centre Scientifique et Technque Du Batiment, both of Paris, all of France

[21] Appl. No.: 675,681

[22] Filed: Jul. 3, 1996

[30] Foreign Application Priority Data

Jul. 7, 1995 [FR] France ................... 95 08573

[51] Int. Cl.$^6$ ................... C01B 33/14
[52] U.S. Cl. ................... 423/338
[58] Field of Search ................... 423/338; 106/287.1, 106/287.34

[56] References Cited

U.S. PATENT DOCUMENTS

| | | | |
|---|---|---|---|
| 4,301,034 | 11/1981 | McDaniel | 252/452 |
| 4,610,863 | 9/1986 | Tewari et al. | 423/338 |
| 4,619,908 | 10/1986 | Cheng et al. | 502/214 |
| 4,835,017 | 5/1989 | Ishikawa et al. | 427/379 |
| 4,894,357 | 1/1990 | Hupe et al. | 502/233 |
| 5,275,796 | 1/1994 | Tillotson et al. | 423/338 |
| 5,496,527 | 3/1996 | Yokogawa et al. | 423/338 |

FOREIGN PATENT DOCUMENTS

| | | |
|---|---|---|
| 0018955 | 12/1982 | European Pat. Off. . |
| 2248334 | 10/1990 | Japan ................... 423/338 |
| 9203378 | 3/1991 | WIPO . |

OTHER PUBLICATIONS

Douglas M. Smith et al., "Preparation of Low-Density-Aerogels at Ambient pressure for thermal insulation", Ceramic Transactions (Porous Materials), vol. 31, 1993 pp. 71-80 no month.

Pajonk G.M. et al.,"Transparent Monolithic Silica Carbogels (aerogels) Using New Polyethoxysilanes as Precursors", Sol-Gel Processing and Applications, 1994 (no month) Edited By Y.A. Atria, Plenum Press, New York, pp. 267-273.

T.M. Tillotson et al., "Transparent Ultralow-Density Silica Aerogels Prepared by a Two Step Sol-Gel Process", Journal of Non-Crystalline Solids 145 Aug. (1992) 44-50 North-Holland Elsevier Science Publishers.

Param H. Tewari et al., "Ambient-Temperature Supercritical Drying of Transparent Silica Aerogels", vol. 3, No. 9-10, 1985 Jul. Amsterdam NL. pp. 363-367 Elsevier Science Publishers, Materials Letter.

Patent Abstracts of Japan, vol. 016 No: 049 (C-0908), Feb. 7, 1992 for JP \-A-03 252312.

*Primary Examiner*—Gary P. Straub
*Assistant Examiner*—Timothy C. Vanoy
*Attorney, Agent, or Firm*—Harris Beach & Wilcox, LLP

[57] ABSTRACT

A process for the preparation of a silica aerogel that includes subjecting a mixture that includes an organosilicon compound and ethyl acetoacetate to hydrolysis and polycondensation in an acidic medium to obtain a transparent gel. The organic solvent is substituted by liquid carbon dioxide and the carbon dioxide is evacuated under supercritical conditions of the carbon dioxide to obtain an aerogel.

10 Claims, 2 Drawing Sheets

PROCESS FOR THE PREPARATION OF MONOLITHIC SILICA AEROGELS

BACKGROUND OF THE INVENTION

The invention relates to an improved process for the preparation of silica aerogels which are in the form of monoliths which are transparent in the visible range and which exhibit very good properties of thermal insulation. It also relates to the silica aerogels thus obtained.

This invention is intended more particularly to be employed in the glazing sector. However, it is not limited to this one application.

In the construction field, success is desired in producing glazing which is able to exhibit maximum thermal insulation properties without at the same time, moreover, affecting the transmission of light in the visible range. Indeed, attempts are made nowadays to obtain components whose thermal insulation properties are such that the limiting factor with regard to this property is no longer the transparent material itself but the system by which it is fastened at the level of the windows or at the level of the facades. The ultimate aim is to obtain glazing whose thermal insulation properties are as good as those of the opaque walls of the building, in accordance with the building regulations regarding heat which are in force.

A large number of solutions have been proposed to date for optimizing this glazing in terms of thermal insulation. Among these, the principle of double glazing has, undeniably, been a significant step forward relative to single glazing, since, by this means, the surface thermal transmission coefficient has been halved. In order to reduce this coefficient still further, it has been proposed to introduce within the double glazing a layer of a material with low emission properties, which, although doubtless leading to the desired result, places a significant strain on the production cost. It has also been proposed to maintain the interglass space of the double glazing under reduced pressure. In addition to the difficulty of implementing such a solution, owing to the fragility of the glass and to problems of airtightness, the results obtained have not proved particularly significant. Furthermore, a proposal has been made to replace the air in the interface by argon. Here again, an improvement in the thermal insulation properties is, without doubt, obtained but at the price of a not insignificant additional cost which is, in any case, not compatible with distribution of the final product on the industrial scale.

Another solution has been to pack the double glazing interface with an aerogel. Aerogels have the advantage of exhibiting good properties of transparency with regard to visible light and excellent thermal insulation properties. Indeed, various techniques for preparing these aerogels have been developed in recent times. In general, aerogels are produced using a sol-gel process in which the solvent used is extracted in order to obtain a porous texture of very low density. The use of such aerogels in the context of the production of double glazing has been described, for example, in the document EP-A-0 018 955. These aerogels were obtained by the abovementioned sol-gel process, consisting in subjecting a silicon alkoxide, in solution in an alcohol, to hydrolysis and polycondensation reactions to give an alcogel. The aerogel is obtained after drying, i.e. extraction of the alcohol from the porous structure of the alcogel.

One of the problems which then arose was the need to avoid impairing the porous texture during evaporation of the solvent, said evaporation giving rise to very intense forces of surface tension on account of the very small dimensions of the pores. It was shown that, in order to escape from these forces of surface tension, the extraction of the solvent should be carried out under conditions of supercriticality of said solvent. The techniques of drying the alcogel under supercritical conditions have given fairly good results in terms of the transparency of the aerogels. Indeed, the surface tensions are reduced almost completely at the temperatures and pressures which are required to reach the supercritical fluid state, so that the gel structure undergoes very little stress during the phase of solvent extraction. However, the conditions of supercriticality of the alcohol are relatively severe, since it is necessary to attain a temperature of typically greater than 270° C. and very high pressures of 12 to 13 MPa. Indeed, the process of supercritical drying is relatively costly and, above all, very time-consuming, since two to three days are typically required for extraction. Moreover, when alcoholic solvents are handled under such operating conditions, the explosion risks are highly increased, and it is necessary to observe a particularly strict operating procedure in order to work under good safety conditions.

With the aim of obtaining a significant reduction in this treatment period, and thus also in its cost, it has been proposed, for example in the document U.S. Pat. No. 4,610,863, in the context of the production of aerogels, to employ indeed a process of supercritical drying but one in which the alcoholic solvent is substituted by carbon dioxide in liquid form, up to the point of total substitution of the alcohol by the liquid $CO_2$. In other words, a "washing" phase is first carried out which consists in solubilizing said solvent in the liquid $CO_2$, in extracting said solvent thus solubilized and then in carrying out, subsequently, the actual drying step when no further trace of alcohol is found. The gel immersed in the liquid $CO_2$ is brought to the conditions of supercriticality of the carbon dioxide, in other words typically to a temperature greater than 31.05° C., and under a pressure of between 8 and 10 MPa. The composition is maintained under these conditions for 30 minutes and then the carbon dioxide is slowly evacuated until atmospheric pressure is reached. A silica aerogel is then obtained which exhibits excellent thermal insulation properties and satisfactory transparency in the visible spectrum. However, the period for substitution of the solvent by carbon dioxide remains relatively long. Moreover, complete solubilization of the solvent in the liquid $CO_2$ is never achieved, with the result that the gel always includes a residue of the solvent which may affect the porous structure of said gel in the drying phase and, consequently, its transparency. Moreover, for the same reason, there is a risk that fissures or cracks will be observed within the aerogel, thereby affecting its monolithic nature and, consequently, its properties of mechanical resistance which are already intrinsically low.

SUMMARY OF THE INVENTION

The object of the present invention is to optimize this process by selecting the silicon compound main component and the organic solvent with which it is mixed in order to form the sol, which is subsequently converted to a gel in accordance with the sol-gel process.

This process for the preparation of monolithic silica aerogels consists:

- in subjecting a mixture based on an organosilicon compound and an organic solvent to hydrolysis and polycondensation in an acidic medium, so as to obtain a transparent gel;
- in then substituting the organic solvent by liquid carbon dioxide;

and finally in evacuating the carbon dioxide under conditions of supercriticality of said carbon dioxide in order to obtain an aerogel.

A feature of the invention is that the organic solvent mixed with the organosilicon compound comprises ethyl acetoacetate.

This selection makes it possible first of all to promote the monolithic nature of the aerogels and, in addition, to optimize the transparency in the visible spectrum of the monoliths thus obtained, since it has been found that complete solubilization of this compound in the liquid $CO_2$ is possible.

According to an advantageous feature of the invention, the organosilicon compound is an organoalkoxysilane and, preferably, tetraethoxysilane.

According to another advantageous feature of the invention, the organosilicon compound or precursor which is mixed with the ethyl acetoacetate is a prepolymer produced from organoalkoxysilane, namely polyethoxydisiloxane (PEDS), and more specifically from tetraethoxysilane.

In a known manner, the prepolymers are silicon compounds of the ethoxy type which are formed by longer or shorter chains of siloxane bridges —Si—O—Si—, and contain various percentages of silica. They correspond to the following empirical formula:

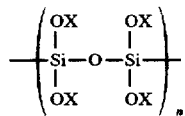

in which X=R and can be $C_2H_5$ or Si—O.

These precursors can be classified according to two criteria: their content of silica, $SiO_2$, and their degree of hydrolysis.

These compounds are in fact obtained by reacting tetraethoxysilane (TEOS) with a substoichiometric quantity of water in an acidic alcoholic medium, in particular in the presence of sulfuric acid, according to the reaction:

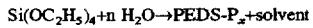

in which n is the fraction of water used and is lower than 2.

A polyethoxydisiloxane PEDS-$P_x$ is obtained in which x=n/2×1000. Thus, for a number n of mols of water, PEDS-$P_{900}$ is obtained, which will be dealt with at length in the subsequent description. It corresponds to a prepolymer with a high degree of hydrolysis.

According to another feature of the invention, the degree of hydrolysis of the prepolymer is between 75 and 90%. In other words, the number x is between 750 and 900.

According to another feature of the invention, the proportion of solvent in the base mixture, with a view to carrying out the sol-gel process, is between 30 and 70% so as to obtain good mechanical properties.

BRIEF DESCRIPTION OF THE DRAWINGS

A description will now be given, in conjunction with the attached figures, of a working example of the production process of the invention with a view to the preparation of a silica aerogel.

DESCRIPTION OF THE INVENTION

First stage: preparation of a precursor

Figure 1:
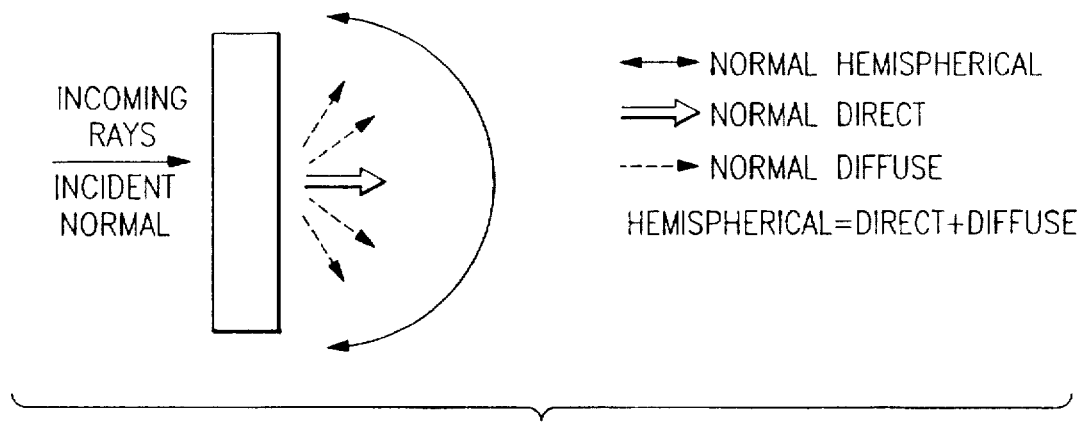
FIG. 1 is a diagram illustrating the method of determining physical parameters which are employed in determining the properties of transparency of the aerogels produced in accordance with the invention.

To synthesize this precursor the first operation is to charge TEOS, i.e. tetraethoxysilane of empirical formula $Si(OC_2H_5)_4$, and half of the total quantity of an alcohol used to a reactor, said alcohol being chosen from the group consisting of methanol, ethanol and isopropyl alcohol. The resulting mixture is stirred vigorously.

In another vessel, a mixture of sulfuric acid (98% strength) with the other half of the isopropyl alcohol is prepared. This solution is added slowly (over one hour) to the first, with stirring. The quantity of water required for partial hydrolysis is added slowly over two hours while keeping the temperature below 37° C. in order to avoid any precipitation of the silica.

In order to establish the desired percentage of silica ($SiO_2$) in the precursor, part of the alcohol present in the resulting solution is distilled off.

The product obtained is a prepolymer: a polyethoxydisiloxane (PEDS-$P_x$) whose empirical formula is:

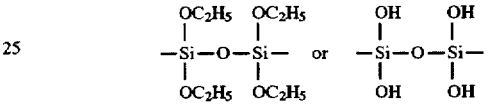

In the context of the present description, the prepolymer used has a degree of hydrolysis of 90%; in other words, the number n of mols of water is equal to 1.8 and the silica content is in the region of 28%: PEDS-$P_{900}$.

It is recalled that, in order to obtain a transparent end product, it is important that the degree of hydrolysis should be between 75 and 90%. If this degree of hydrolysis is less than 75%, the transparency becomes rapidly impaired even if the thermal insulation properties remain very good. On the other hand, if this degree of hydrolysis exceeds 90%, the prepolymer obtained is unstable. It in fact forms a gel in a few days.

Second step: preparation of an alcogel

The following step relates to the production of a monolithic alcogel which is transparent and free from cracking and is in the form of a parallelepiped. It is produced using a sol-gel procedure which, in turn, employs polycondensation reactions. The PEDS-$P_{900}$ precursor obtained in the course of the preceding step is mixed with a solvent and, if appropriate, with a quantity of deionized water, the solvent comprising, in accordance with a fundamental feature of the invention, ethyl acetoacetate. This mixture, to which is added a volume of 1% of concentrated (21N) hydrofluoric acid, is subjected to vigorous stirring. In this way a gel is obtained from the initial sol, which will subsequently undergo a drying operation described in more detail below.

This sol-gel step is carried out in a vessel which serves as a mold and consists of two parallel walls made of separate glass plates and supported by a silicone joint. At least one of the inner glass faces is covered with a silicone oil coating, or receives a layer of polytetrafluoroethylene (registered trademark: TEFLON) in order to avoid any destruction of the monolith when it is removed from the mold after drying.

Conversion to a gel takes place very rapidly, typically within a few seconds, and the transparency of the gel obtained is excellent, the reaction temperature being ambient temperature. When the transparent and monolithic alcogel has been synthesized, the next step consists in drying the gel.

Third step: drying of the gel

The aim of this step is to remove the solvent which is trapped in the three-dimensional network formed by the silica and at the same time to ensure the transparency and monolithic nature of the gel.

Liquid $CO_2$ is thus employed in order first to effect exchange between the liquid $CO_2$ and the ethyl acetoacetate which is present in the silica network and then to extract the $CO_2$ under supercritical conditions. The evacuation of the solvent from the silica network under supercritical conditions makes it possible to cancel out the surface tension of said solvent, which leaves the pores of the gel without exerting the capillary stresses which would cause breakdown of the texture of the gel to be dried.

To carry out this drying step, an autoclave is used in which the sample is dried. For this purpose the autoclave is closed and then filled with liquid carbon dioxide by gradually opening an inlet valve which is connected to a flask of $CO_2$ with a dip tube, and a pressure-reducing valve. Filling with liquid $CO_2$ takes place gradually so as not to produce turbulence within the autoclave which might damage the samples. When the autoclave is full of liquid $CO_2$, the outlet valve of the autoclave is opened to recover a mixture of dry ice and solvent (ethyl acetoacetate). This is followed by the implementation of a succession of static phases, enabling the solubilization of the ethyl acetoacetate in the liquid $CO_2$, and dynamic steps for extraction of a mixture of dry ice and solvent until said solvent has been evacuated completely. When, after titration, no further solvent is found in the mixture extracted via the outlet valve of the autoclave, the latter is isolated (inlet and outlet valves closed). At this point in time it contains a quantity of liquid $CO_2$ enabling supercritical conditions to be reached.

The temperature is then raised in linear progression until it exceeds the critical temperature of $CO_2$ ($T_c$=31.05° C.), typically 400° C., under a pressure of the order of 80 to 100 bars, i.e. from 8 to 10 MPa. The duration of heating is approximately one hour and is followed by a period of isothermal and isobaric stabilization lasting approximately 30 minutes in order in particular to ensure thermal equilibrium between the fluid and gel. The autoclave is then let down by evacuation of the supercritical fluid ($CO_2$), an attempt being made to carry out this procedure isothermally. Owing to the fact that evacuation of the supercritical fluid is accompanied by cooling of the body of the autoclave, this loss of heat is therefore compensated by auxiliary heating in order to just maintain this isothermal letdown, and this is carried out until atmospheric pressure is reached.

The contents of the autoclave are then flushed with a stream of nitrogen. The autoclave is isolated and the temperature is reduced to ambient temperature in accordance with an isobaric descent.

A possible variant of this drying step consists in injecting the $CO_2$ directly in the form of a super-critical fluid, i.e. a fluid at a temperature greater than 31.05° C. and under a minimum pressure of 8 MPa. In addition to the time saving provided by the use of this supercritical fluid, it has also been observed that the solvent qualities of $CO_2$ in this form are improved.

An aerogel in monolithic and transparent form is thus obtained which exhibits excellent properties of transparency in the visible range as well as excellent thermal insulation properties.

In order to characterize these properties it is proposed to define the optical performance characteristics of the gel obtained, using the method described below. A Perkin-Elmer $\lambda$19 spectrometer is used which is equipped with an integration sphere and light sources which cover the UV-visible and near infrared spectral range, i.e. wavelengths covering the range between 0.3 and 2.5 μm. For each of the samples, the normal/hemispherical transmission spectrum and the normal/diffuse transmission spectrum are recorded, as indicated in FIG. 1. These data are used to calculate the normal/hemispherical light transmission factor, termed $\tau_v^{nh}$, corresponding to a weighted integration of the visible region of the spectrum (0.3 μm to 0.8 μm) and the normal/hemispherical energy transmission factor, termed $\tau_e^{nh}$, corresponding to a weighted integration over all of the range investigated (0.3 to 2.5 μm). In the same way, the normal/direct transmission factor, $\tau_v^{nd}$, is calculated.

In order to assess the transparency of the aerogel thus obtained, the ratio between the normal/direct light transition factor and the normal/hemispherical light transmission factor is determined, which is called the transparency ratio and is abbreviated T.R. T.R. is thus defined by the relation:

$$T.R.=\tau_v^{nd}/\tau_v^{nh}\times 100$$

In FIG. 2, therefore, various spectral curves are shown which represent the change in the normal/hemispherical, normal/direct and normal/diffuse transmission as a function of the wavelength within the spectral range from 0.3 to 2.5 μm. The figure shows, respectively:

curve I: for a float glass, which is well known in the context of the production of single and double glazing, 4 mm in thickness;

curve II: for a silica aerogel which is 20 mm thick, obtained in accordance with the process developed by the company AIRGLASS, i.e. tetramethoxysilane hydrolyzed in the presence of ammonia and subjected to polycondensation in methanol—drying phase carried out in an autoclave under supercritical conditions for the methanol;

curve III: for an aerogel according to the process described above, i.e. synthesized from a precursor consisting of PEDS-$P_{900}$ with a concentration of solvent (ethyl acetoacetate) of 50% by volume (sample CNS1), whose thickness is 10 mm;

curve IV: for another aerogel according to the invention, i.e. synthesized from a precursor consisting of PEDS-$P_{900}$ with a concentration of solvent (ethyl acetoacetate) of 60% by volume (sample C320), whose thickness is 6 mm.

Table 1 below summarizes the results of the optical measurements carried out on the samples set out in FIG. 2.

| sample | $\tau_v^{nh}$ | $\tau_e^{nh}$ | $\tau_v^{nd}$ | T.R. |
| --- | --- | --- | --- | --- |
| 4 mm float glass | 90.1 | 88.2 | 88.2 | 97.9 |
| AIRGLASS | 63.9 | 71.6 | 50.8 | 79.5 |
| CNS1 | 88.6 | 88.5 | 77.0 | 86.9 |
| C320 | 90.8 | 90.4 | 82.4 | 90.8 |

Thus the closer the factor T.R. to 100, the better the vision and the recognition of shapes through the optical system and therefore the more transparent the silica aerogel.

In addition to the study of the optical characteristics presented, it is also suitable to add the analysis of the thermal characteristics, since the objective of the invention is to obtain a transparent monolithic aerogel exhibiting excellent thermal insulation properties.

In this regard, these thermal insulation properties can be characterized by the value of the thermal conductivity coefficient $\lambda$. Thus glass is characterized by a thermal conductivity of $\lambda=1\text{W m}^{-1}\text{K}^{-1}$, which is very much greater than that of air: $\lambda=0.024\text{ W m}^{-1}\text{K}^{-1}$. This difference is due principally to the absence of porosity in the glass. However, the silica aerogel obtained in accordance with the invention has a very high porosity of the order of 83 to 96%.

Figure 3:
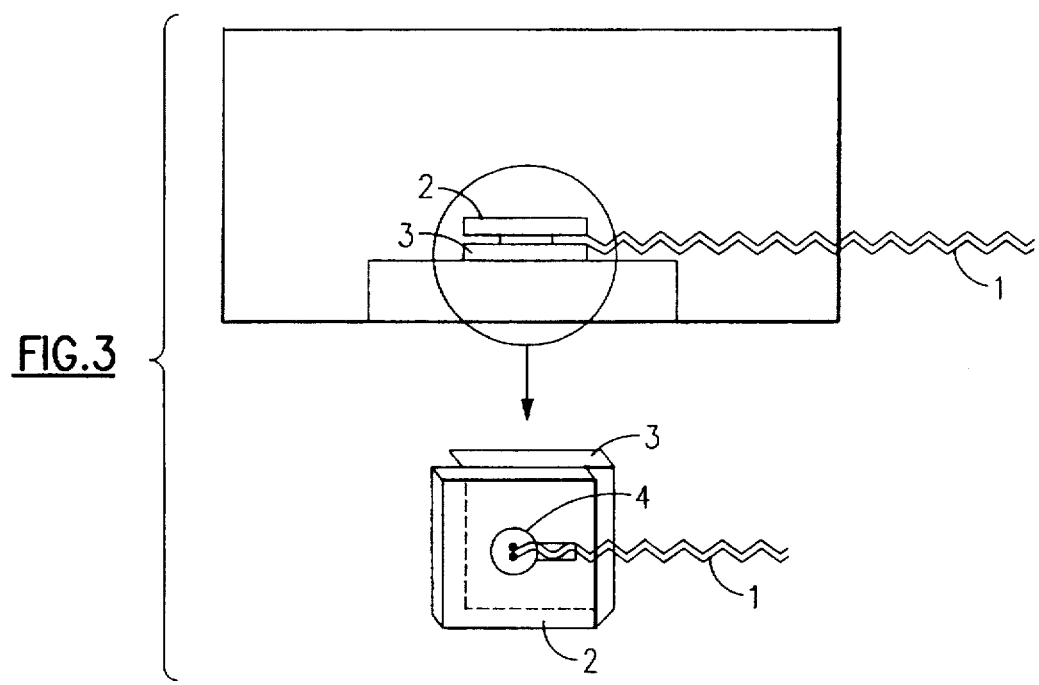
FIG. 3 is a diagram of the apparatus employed in determining the thermal conductivity of said samples.
Figure 2A:
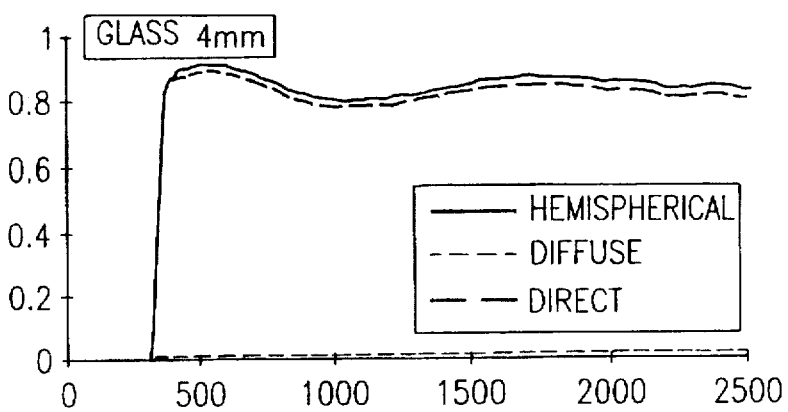
FIG. 2 is a set of curves showing the variation in the transmission factor through various samples as a function of the wavelength.
Figure 2B:
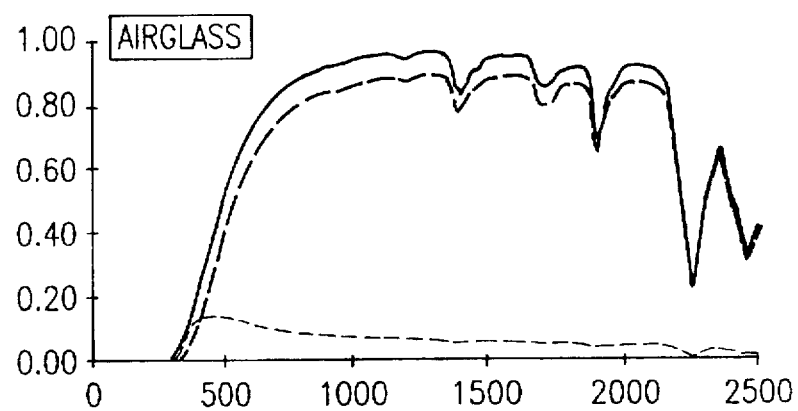
Figure 2C:
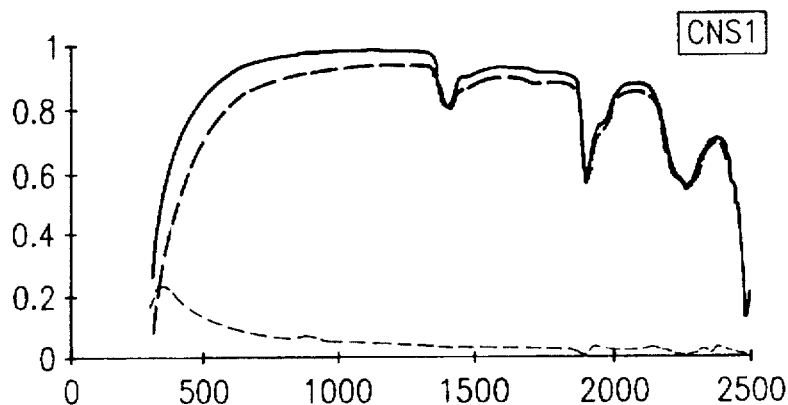
Figure 2D:
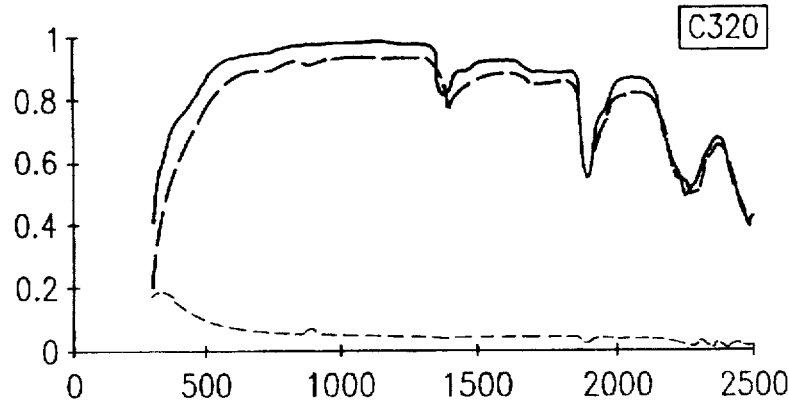

In order to measure the thermal characteristics of the silica aerogels obtained an apparatus was used which is represented diagrammatically in FIG. 3, and which is based on the principle of the technique of thermal shock. Electrical power is fed into a heating wire (1) placed between the silica aerogel sample (2) to be measured and an insulator (3) whose thermal conductivity is fully known, and the temperature change induced by this flux is monitored as a function of time using a temperature probe (4). The thermal conductivity is determined by the slope of the curve representing the temperature as a function of the time logarithm, according to the expression:

$$T = \frac{RI^2}{4\pi\lambda} \ln t + \text{constant}$$

where

T is the temperature in degrees Celsius
R is the heating resistance in $\Omega$/m
I is the current intensity in amperes
t is the time in seconds
$\lambda$ is the thermal conductivity in $\text{W m}^{-1}\text{K}^{-1}$.

A $\lambda$ value is thus obtained for the thermal conductivity of the first sample CNS1, produced according to the invention, of 0.015 $\text{Wm}^{-1}\text{K}^{-1}$, and for the second sample C320 of 0.020 $\text{Wm}^{-1}\text{K}^{-1}$ when they are subject to the atmospheric pressure of air. Related to a light transmission factor in normal hemispherical mode of greater than 85%, these values impart to the resulting aerogel particularly advantageous properties which are specifically sought after in the construction field in particular.

In other words, the value obtained for the thermal conductivity is less than that of air and therefore makes it possible to produce transparent monolithic aerogels of very low thermal conductivity in combination with properties of transparency, in the visible region, which are very close to those of glass. In fact, the resulting aerogels are capable of being used successfully within double glazing, under atmospheric pressure, taking into account the desired specificities regarding these two properties. Their apparent thermal conductivity can even be lowered if such aerogels are used within double glazing or within any enclosure which is under the atmospheric pressure of a noble gas or under a subatmospheric pressure of air or a noble gas.

Thus the $\lambda$ value of the thermal conductivity of these samples, obtained according to the process of the invention, becomes lower than or equal to 0.015 $\text{Wm}^{-1}\text{K}^{-1}$ when they are subject to the atmospheric pressure of a noble gas from the air, in particular argon, xenon or krypton.

Moreover, other applications may be envisaged for this material, especially for superinsulating panels in the field of the refrigeration industry, oven doors, covers of solar collectors, transparent insulation modules and, moreover, for catalyst supports on account of its specific surface area, which is particularly great owing to its porous structure.

We claim:

1. A process for the preparation of a monolithic silica aerogel that includes the steps of:

subjecting a mixture including an organosilicon compound and an organic solvent to hydrolysis and polycondensation in an acidic medium to obtain a transparent gel, substituting the organic solvent in the transparent gel with liquid carbon dioxide, and evacuating the carbon dioxide under supercritical conditions of the carbon dioxide to obtain the aerogel, wherein the organic solvent consists essentially of ethyl acetoacetate.

2. The process for the preparation of a silica aerogel as claimed in claim 1, wherein the organosilicon compound is an organoalkoxysilane.

3. The process for the preparation of a silica aerogel as claimed in claim 2, wherein the organoalkoxysilane is tetraethoxysilane.

4. The process for the preparation of a silica aerogel as claimed in claim 1, wherein the organosilicon compound comprises a prepolymer, said prepolymer being a polyethoxydisilane produced from an organoalkoxysilane.

5. The process for the preparation of a silica aerogel as claimed in claim 4, wherein the polyethoxydisiloxane is synthesized by hydrolysis under sub-stoichiometric conditions of water from tetraethoxysilane and an alcohol chosen from the group consisting of methanol, ethanol and isopropyl alcohol.

6. The process for the preparation of a silica aerogel as claimed in claim 5, wherein the degree of hydrolysis of the polyethoxydisiloxane, defined as half the number of mols of water employed in the course of hydrolysis of the tetraethoxysilane, is between 0.75 and 0.90.

7. The process for the preparation of a silica aerogel as claimed in claim 4, wherein the prepolymer is mixed with the ethyl acetoacetate under acid catalysis.

8. The process for the preparation of a silica aerogel as claimed in claim 7, wherein the acid used in the acid catalysis is hydrofluoric acid.

9. The process for the preparation of a silica aerogel as claimed in claim 4, wherein the prepolymer is tetraethoxysilane.

10. The process for the preparation of a silica aerogel as claimed in claim 1, wherein the proportion of ethyl acetoacetate in the mixture, is between 30 and 70% by volume.

* * * * *

UNITED STATES PATENT AND TRADEMARK OFFICE
CERTIFICATE OF CORRECTION

PATENT NO. : 5,795,557
DATED : August 18, 1998
INVENTOR(S) : Pajonk et al.

It is certified that error appears in the above-identified patent and that said Letters Patent is hereby corrected as shown below:

On the title page item

[75] Inventors: delete the "s" in Lyons

[73] Assignees: delete "Armienes" and insert --Armines--.

delete "Technque" and insert --Technique--.

Signed and Sealed this

Second Day of March, 1999

*Attest:*

Q. TODD DICKINSON

*Attesting Officer*    Acting Commissioner of Patents and Trademarks

UNITED STATES PATENT AND TRADEMARK OFFICE
CERTIFICATE OF CORRECTION

PATENT NO. : 5,795,557
DATED : August 18, 1998
INVENTOR(S) : Pajonk et al.

It is certified that error appears in the above-indentified patent and that said Letters Patent is hereby corrected as shown below:

TITLE PAGE

[73] Assignees: Please correct the name Universite Claude Bernard to read --Universite Claude Bernard Lyon I--.

Signed and Sealed this

Twenty-eighth Day of September, 1999

Attest:

Q. TODD DICKINSON

*Attesting Officer*  *Acting Commissioner of Patents and Trademarks*